United States Patent
Polubinski et al.

(10) Patent No.: US 9,452,645 B2
(45) Date of Patent: Sep. 27, 2016

(54) TIRE INFLATION SYSTEM WITH PRESSURIZED GAS ROUTING THROUGH A SPINDLE

(71) Applicant: ArvinMeritor Technology, LLC, Troy, MI (US)

(72) Inventors: James G. Polubinski, Fraser, MI (US); Timothy J. Boothby, Troy, MI (US); Kevin Tracy, Warren, MI (US); Nicholas S. Lakin, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 344 days.

(21) Appl. No.: 14/048,112

(22) Filed: Oct. 8, 2013

(65) Prior Publication Data
US 2015/0096656 A1    Apr. 9, 2015

(51) Int. Cl.
*B60C 23/00*    (2006.01)

(52) U.S. Cl.
CPC .................................. *B60C 23/003* (2013.01)

(58) Field of Classification Search
CPC .... B60C 23/00; B60C 23/001; B60C 23/003
USPC ................................................ 152/415–417
See application file for complete search history.

(56) References Cited

U.S. PATENT DOCUMENTS

| | | | | |
|---|---|---|---|---|
| 4,883,106 A | * | 11/1989 | Schultz | B60B 7/002 |
| | | | | 152/415 |
| 6,394,159 B1 | * | 5/2002 | Cobb | B60C 23/003 |
| | | | | 152/416 |
| 6,994,136 B2 | | 2/2006 | Stanczak | |
| 7,207,365 B2 | * | 4/2007 | Nelson | B60C 23/003 |
| | | | | 152/415 |
| 7,302,979 B2 | * | 12/2007 | Davison | G01P 3/443 |
| | | | | 152/417 |
| 7,931,061 B2 | | 4/2011 | Gonska et al. | |
| 8,505,600 B2 | * | 8/2013 | Padula | B60C 23/003 |
| | | | | 152/415 |
| 2005/0194079 A1 | * | 9/2005 | Hennig | B60C 23/003 |
| | | | | 152/417 |
| 2006/0207705 A1 | * | 9/2006 | Davison | G01P 3/443 |
| | | | | 152/415 |
| 2012/0186714 A1 | | 7/2012 | Richardson | |
| 2012/0234447 A1 | | 9/2012 | Narloch et al. | |
| 2016/0016443 A1 | * | 1/2016 | Morgan | B60C 23/003 |
| | | | | 152/417 |

OTHER PUBLICATIONS

Meritor an ArvinMeritor brand, Meritor Tire Inflation System (MTIS) by PSI(TM), including Mentor ThermALERT (TM), PB-9999, Revised May 2007.

* cited by examiner

*Primary Examiner* — Jason Bellinger
(74) *Attorney, Agent, or Firm* — Brooks Kushman P.C.

(57) ABSTRACT

A tire inflation system having a spindle that has a spindle fastener hole and spindle passage through which a pressurized gas flows for inflating a tire. An adapter or a fastener tube may inhibit pressurized gas from flowing from the spindle passage into the spindle fastener hole.

16 Claims, 4 Drawing Sheets

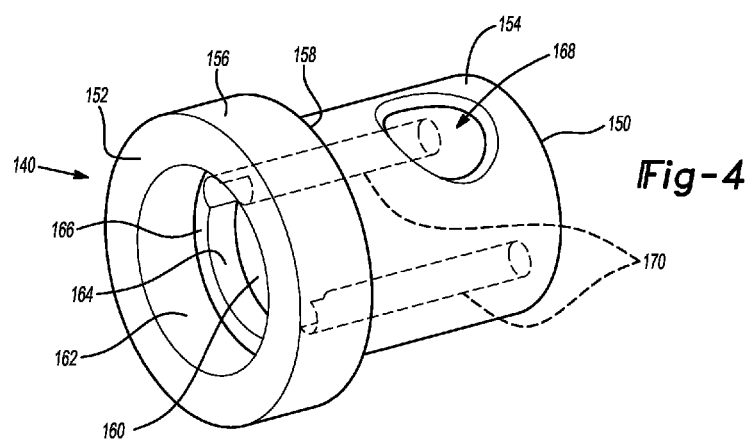
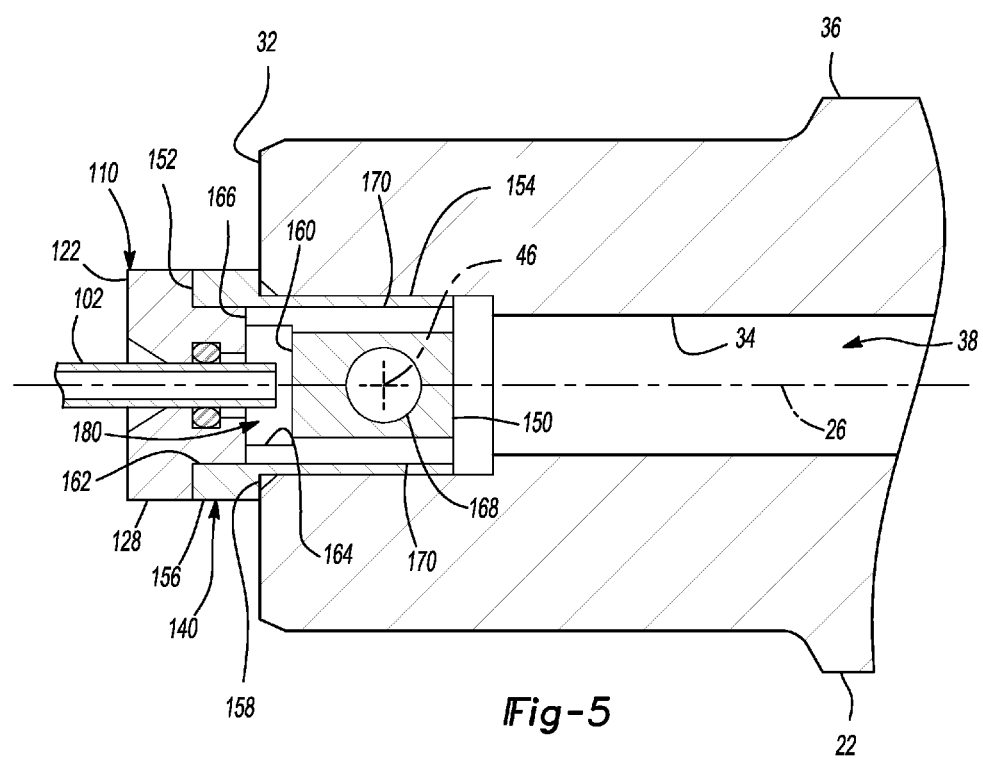

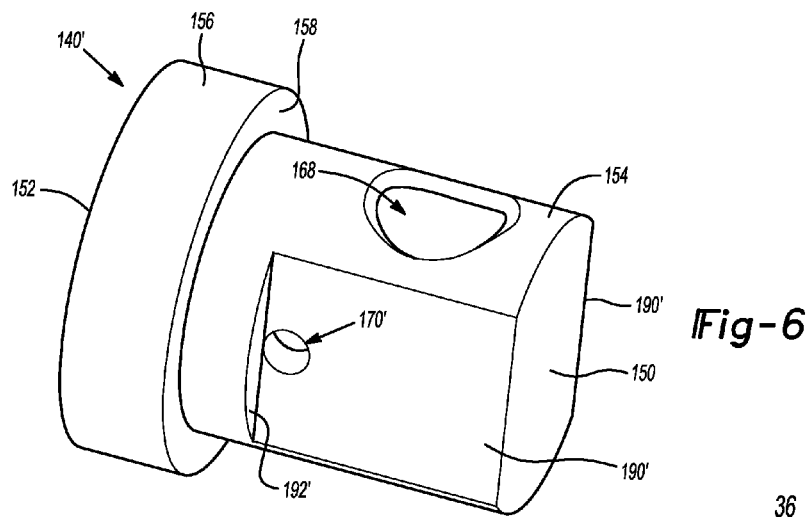
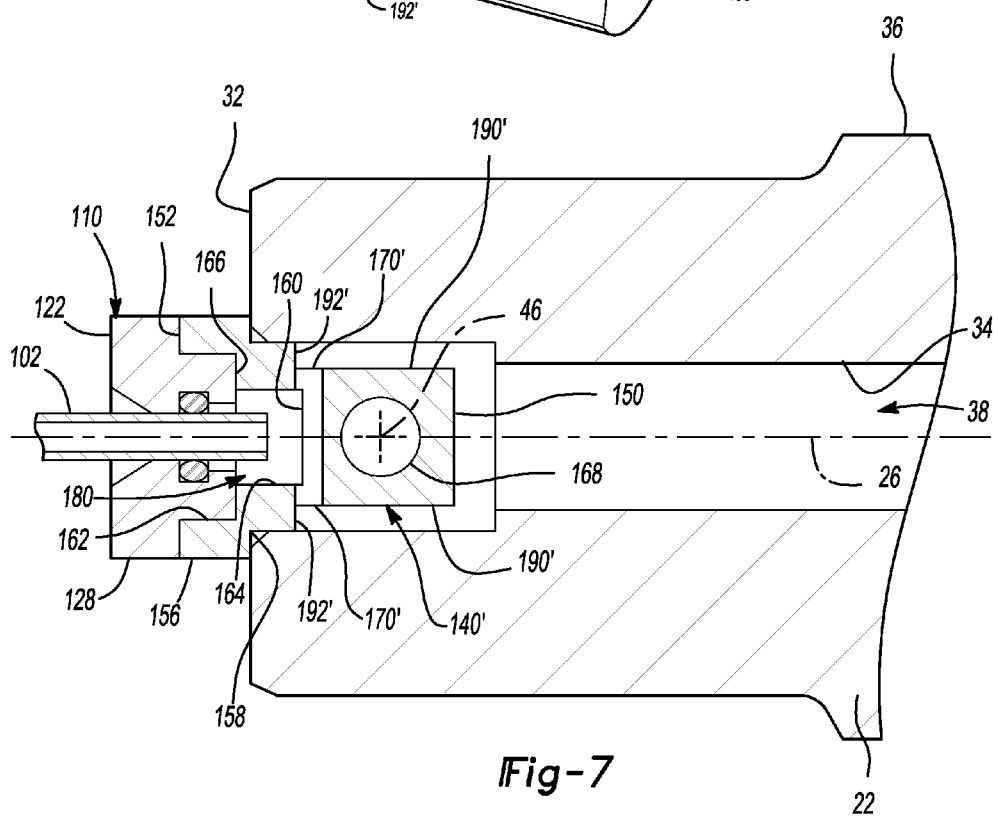

TIRE INFLATION SYSTEM WITH PRESSURIZED GAS ROUTING THROUGH A SPINDLE

TECHNICAL FIELD

This patent application relates to a tire inflation system in which pressurized gas is routed through a spindle.

BACKGROUND

A tire inflation system is disclosed in U.S. Pat. No. 7,931,061.

SUMMARY

In at least one embodiment, a tire inflation system is provided. The tire inflation system may include a spindle, an adapter, a fitting, and a fastener. The spindle may rotatably support a wheel and may include a spindle passage and a spindle fastener hole. Pressurized gas may flow through the spindle passage. The spindle fastener hole may extend through the spindle and may intersect the spindle passage. The adapter may be disposed in the spindle passage. The adapter may include an adapter fastener hole and an adapter passage. The adapter fastener hole may be aligned with the spindle fastener hole. The adapter passage may receive the pressurized gas from the spindle passage. The adapter passage may not be fluidly connected to the adapter fastener hole. The fitting may be disposed proximate the adapter. The fitting may receive the pressurized gas from the adapter passage and may be fluidly connected to the tire. The fastener may extend through the spindle fastener hole and the adapter fastener hole.

In at least one embodiment, a tire inflation system is provided. The tire inflation system may include a spindle, a fitting, a fastener tube, and a fastener. The spindle may rotatably support a wheel and may include a spindle passage and a spindle fastener hole. The spindle passage may be disposed along an axis. Pressurized gas for inflating a tire may flow through the spindle passage. The spindle fastener hole may extend through the spindle and may intersect the spindle passage. The fitting may be disposed in the spindle passage. The fitting may receive pressurized gas from the spindle passage and may be fluidly connected to the tire. The fastener tube may extend through the spindle fastener hole. The fastener tube may inhibit pressurized gas from flowing from the spindle passage into the spindle fastener hole. The fastener may extend through the fastener tube to inhibit movement of the spindle nut that is disposed on the spindle.

BRIEF DESCRIPTION OF THE DRAWINGS

FIG. 4 is a perspective view of a first embodiment of an adapter that may be provided with the tire inflation system.

FIG. 5 is a top section view of a portion of the wheel end assembly with the adapter of FIG. 4.

FIG. 6 is a perspective view of a second embodiment of an adapter that may be provided with the tire inflation system.

FIG. 7 is a top section view of a portion of the wheel end assembly with the adapter of FIG. 6.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
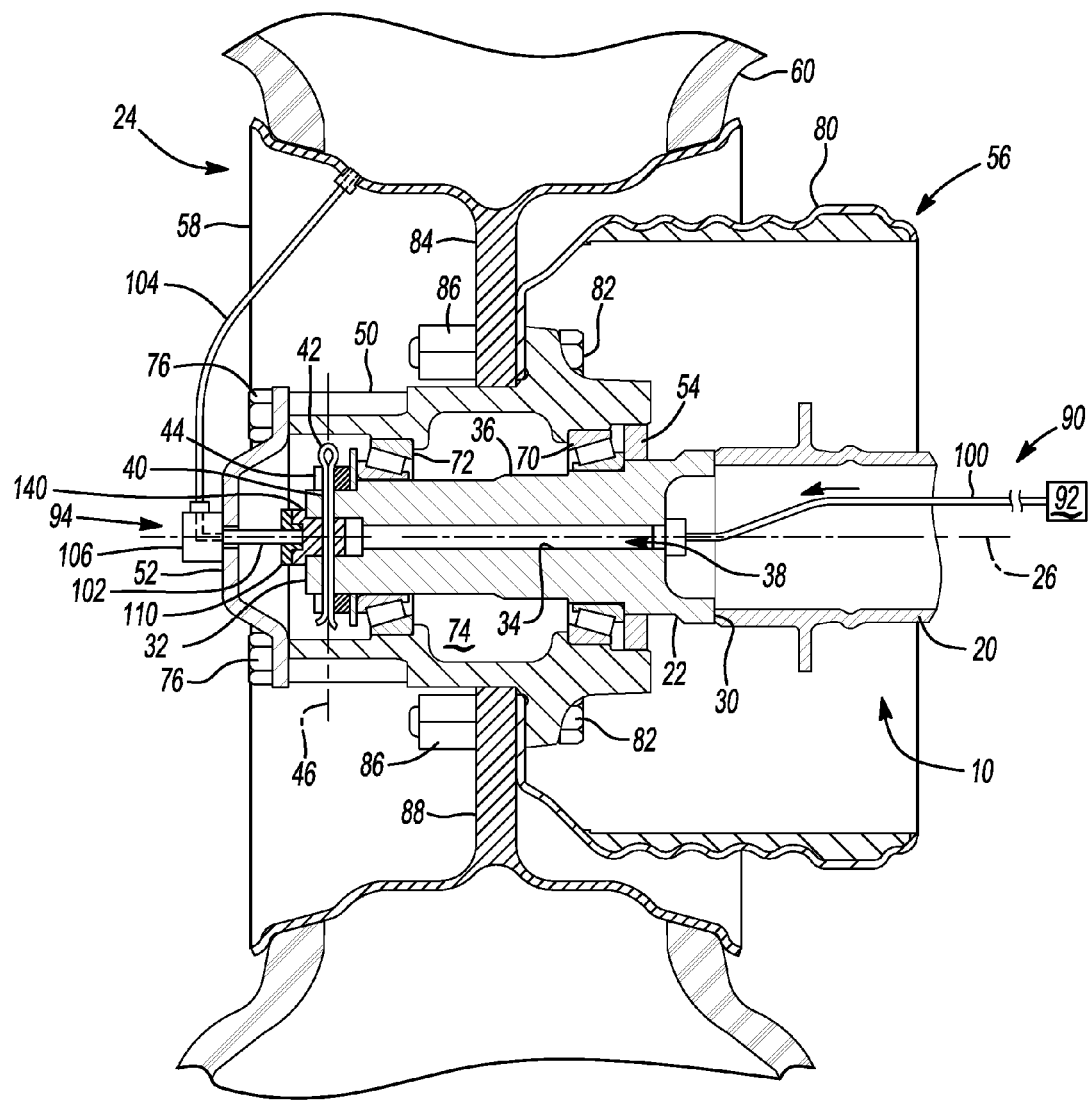
FIG. 1 is a section view of an exemplary wheel end assembly and a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels, or a trailer that may be provided with a motor vehicle.

The axle assembly 10 may be configured as a non-drive axle in one or more embodiments. As such, the axle assembly 10 may not receive torque from a power source, such as an internal combustion engine or electric motor, that may be used to propel the vehicle. The axle assembly 10 may or may not be steerable. In a non-drive axle configuration, the axle assembly 10 may include an axle housing 20, a spindle 22, and a wheel end assembly 24.

The axle housing 20 may receive or support various components of the axle assembly 10. In addition, the axle housing 20 may facilitate mounting of the axle assembly 10 to the vehicle.

The spindle 22 may be provided with or may be fixedly positioned with respect to the axle assembly 10. In a steerable configuration, the spindle 22 may be provided with or may be fixedly positioned with respect to a steering knuckle rather than the axle housing 20. The spindle 22 may generally extend along but may not rotate about an axis 26. In at least one embodiment, the spindle 22 may include a first spindle end surface 30, a second spindle end surface 32, an internal surface 34, an external surface 36, a spindle passage 38, and a spindle fastener hole 40.

The first spindle end surface 30 may be disposed proximate or may engage the axle housing 20. Alternatively, the first spindle end surface 30 may be omitted in a configuration in which the spindle 22 is integrally formed with the axle housing 20 or is not provided as a separate component. The second spindle end surface 32 may be disposed opposite the first spindle end surface 30.

The internal surface 34 may extend between the first spindle end surface 30 and the second spindle end surface 32 and may at least partially define the spindle passage 38. Pressurized gas for inflating a tire may flow through the spindle passage 38. For example, the spindle passage 38 may define a conduit that receives pressurized gas or the spindle passage 38 may receive a conduit, such as a hose, tubing or the like that may receive pressurized gas and that may extend at least partially through the spindle passage 38.

The external surface 36 may be disposed opposite the internal surface 34. The external surface 36 of the spindle 22 may support one or more wheel bearings that may rotatably support the wheel end assembly 24 as will be discussed in more detail below.

The spindle fastener hole 40 may be configured to receive a fastener 42, such as a cotter pin, that may help secure or inhibit movement of a spindle nut 44 that may be disposed on the spindle 22. The spindle nut 44 may help inhibit axial movement of the wheel end assembly 24. The spindle fastener hole 40 may extend along a spindle fastener hole axis 46. The spindle fastener hole axis 46 may intersect and may be disposed substantially perpendicular to the axis 26 in one or more embodiments. The spindle fastener hole 40 may intersect the spindle passage 38 and may extend completely through the spindle 22 such that the spindle passage 38 may separate or bisect the spindle fastener hole 40.

The wheel end assembly 24 may be rotatably disposed on the spindle 22. The wheel end assembly 24 may include a hub 50, a hub cap 52, wheel end seal assembly 54, a brake subsystem 56, a wheel 58, and a tire 60.

The hub 50 may be rotatably disposed on the spindle 22 and may be configured to rotate about the axis 26. For instance, one or more wheel bearings may be mounted on spindle 22 and may rotatably support the hub 50. In FIG. 1, a first wheel bearing 70 and a second wheel bearing 72 are provided in a cavity 74 that is located between the spindle 22 and the hub 50. The first wheel bearing 70 may be disposed inboard or further from the second spindle end surface 32 than the second wheel bearing 72.

The hub cap 52 may be coupled to the hub 50 with one or more fasteners 76. As such, the hub cap 52 may rotate with the hub 50.

The wheel end seal assembly 54 may be disposed between the spindle 22 and the hub 50. The wheel end seal assembly 54 may inhibit contaminants from entering the cavity 74 and may help retain lubricant in the cavity 74. In at least one embodiment, the wheel end seal assembly 54 may be fixedly disposed with respect to the hub 50 and may rotate about the axis 26 and with respect to the spindle 22.

The brake subsystem 56 may be adapted to slow or inhibit rotation of at least one associated wheel 58. For example, the brake subsystem 56 may be configured as a friction brake, such as a drum brake or a disc brake. In FIG. 1, a portion of the brake subsystem 56 is shown with a drum brake configuration. In a drum brake configuration, a brake drum 80 may be fixedly disposed on the hub 50 with one or more fasteners 82, such as wheel lug studs. The brake drum 80 may extend continuously around brake shoe assemblies (not shown) that may be configured to engage the brake drum 80 to slow rotation of an associated wheel 58.

The wheel 58 may be fixedly disposed on the hub 50. For example, the wheel 58 may be mounted on the hub 50 via the fasteners 82. More specifically, the wheel 58 may have a wheel mounting flange 84 that may have a set of holes that may each receive a fastener 82. A lug nut 86 may be threaded onto each fastener to secure the wheel 58 to the fasteners 82 and the hub 50. The lug nut 86 may engage or may be disposed proximate an outboard side 88 of the wheel mounting flange 84 that may face away from the brake drum 80 or toward the hub cap 52. The wheel 58 may be configured to support the tire 60. The tire 60 may be a pneumatic tire that may be inflated with a pressurized gas or pressurized gas mixture.

A tire inflation system 90 may be associated with the wheel end assembly 24. The tire inflation system 90 may be disposed on the vehicle and may be configured to provide a pressurized gas or pressurized gas mixture to one or more tires 60. For clarity, the term "pressurized gas" may refer to either a pressurized gas or a pressurized gas mixture. The tire inflation system 90 may include a control system that may monitor and control the inflation of one or more tires 60, a pressurized gas source 92, and a gas supply subsystem 94.

The pressurized gas source 92 may be configured to supply or store a volume of a pressurized gas or pressurized gas mixture, like air or nitrogen. For example, the pressurized gas source 92 may be a tank and/or a pump like a compressor. The pressurized gas source 92 may be disposed on the vehicle and may provide a pressurized gas or pressurized gas mixture at a pressure that is greater than or equal to a desired inflation pressure of a tire 60. As such, the pressurized gas source 92 may inflate a tire or maintain a desired tire pressure.

The gas supply subsystem 94 may fluidly connect the pressurized gas source 92 to the tire 60. The gas supply subsystem 94 may include one or more conduits, such as a hose, tubing, pipe, or combinations thereof. In FIG. 1, a first conduit 100, a connection conduit 102, and a second conduit 104 are shown. The first conduit 100 may receive pressurized gas from the pressurized gas source 92 and may fluidly connect the pressurized gas source 92 to the spindle passage 38. The connection conduit 102 may receive pressurized gas from the spindle passage 38 and may supply pressurized gas to the second conduit 104. For example, the connection conduit 102 may extend through a hole in the hub cap 52 and may be connected to the second conduit 104 with a fitting 106. The second conduit 104 may receive pressurized gas from the connection conduit 102 and may supply pressurized gas to the tire 60. The routing of the conduits between the pressurized gas source 92 and a tire 60 that is shown in FIG. 1 is exemplary and is not meant to be limiting as other conduit routing paths may be provided. In addition, one or more valves may be associated with or provided with a conduit to enable or disable the flow of the pressurized gas from the pressurized gas source 92 to one or more tires 60. The flow of pressurized gas is represented by the arrows located near the conduits in FIG. 1.

Figure 3:
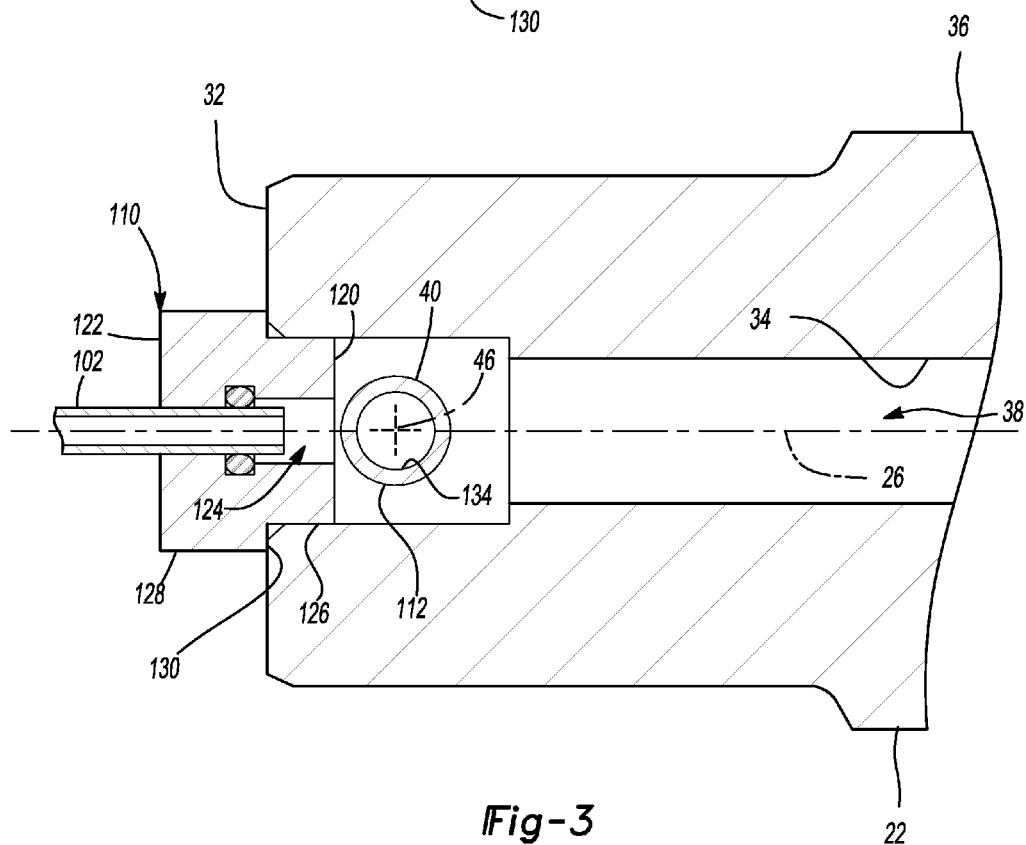
FIG. 3 is a top section view of a portion of the wheel end assembly with the adapter of FIG. 2.

Referring to FIGS. 3, 5, and 7, exemplary interfaces between the wheel end assembly 24 and the gas supply subsystem 94 are shown. In each configuration, pressurized gas may be routed through the spindle passage 38 to the connection conduit 102. In addition, the fastener 42 is omitted from FIGS. 3, 5, and 7 for clarity.

Figure 2:
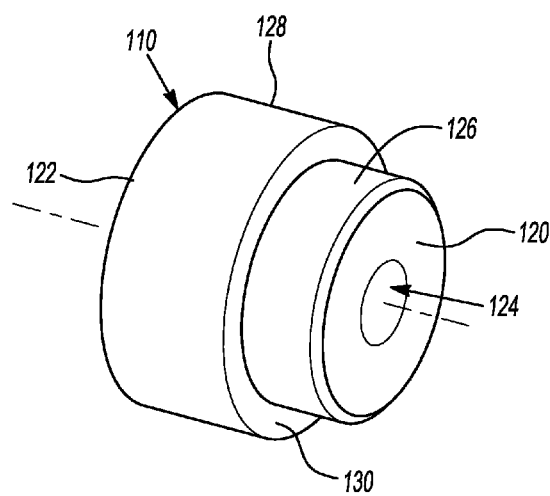
FIG. 2 is a fitting that may be provided with a wheel end assembly.

Referring to FIGS. 2 and 3, a first example of an interface is shown. In this embodiment, a fitting 110 and a fastener tube 112 are employed.

The fitting 110 may receive pressurized gas from the spindle passage 38 and may help fluidly connect the pressurized gas source 92 to the tire 60. The fitting 110 may have a first fitting end surface 120, a second fitting end surface 122, a fitting hole 124, a first outer fitting surface 126, a second outer fitting surface 128, and a fitting step surface 130.

The first fitting end surface 120 may be disposed at an end of the fitting 110. The first fitting end surface 120 may be disposed opposite the second fitting end surface 122 and may be received in the spindle passage 38 as is best shown in FIG. 3. In addition, the first fitting end surface 120 may be spaced apart from the fastener tube 112.

The fitting hole 124 may extend from the first fitting end surface 120 to the second fitting end surface 122. The fitting hole 124 may receive the connection conduit 102. In addition, the fitting hole 124 may receive pressurized gas from the spindle passage 38 and may route pressurized gas to the connection conduit 102. A seal may be disposed in the fitting hole 124 between the connection conduit 102 and the fitting 110 to help inhibit leakage of pressurized gas between the fitting 110 and the connection conduit 102.

The first outer fitting surface 126 may extend from the first fitting end surface 120 toward the second fitting end surface 122. The first outer fitting surface 126 may at least partially define an outside circumference of the fitting 110. In addition, the first outer fitting surface 126 may be disposed in the spindle passage 38 and may engage the spindle 22 to help inhibit leakage of pressurized gas between the fitting 110 and the spindle 22.

The second outer fitting surface 128 may extend from the second fitting end surface 122 toward the first fitting end surface 120 and the fitting step surface 130. The second outer fitting surface 128 may at least partially define an outside circumference of the fitting 110 and may have a larger diameter than the first outer fitting surface 126.

The fitting step surface 130 may extend from the first outer fitting surface 126 to the second outer fitting surface 128. In at least one embodiment, the fitting step surface 130 may engage the second spindle end surface 32 to help position and inhibit axial movement of the fitting 110 with respect to the spindle 22.

Referring to FIG. 3, the fastener tube 112 may receive the fastener 42 (which is not shown in FIG. 3 for clarity) and may extend through the spindle fastener hole 40 to inhibit or prevent pressurized gas from exiting the spindle 22 via the spindle fastener hole 40. The fastener tube 112 may have a tubular configuration and may have a fastener tube hole 134 through which the fastener 42 may extend. The fastener tube 112 may extend along an axis, such as the spindle fastener hole axis 46 and may be disposed substantially perpendicular to the axis 26. The fastener tube 112 may be spaced apart from the fitting 110 and may be smaller than the spindle passage 38. As such, pressurized gas may flow around the fastener tube 112 to reach the fitting 110. The fastener tube 112 may be secured to the spindle 22 in any suitable manner, such as with an interference fit and/or one or more seals that may inhibit leakage of pressurized gas between the spindle 22 and the fastener tube 112.

Referring to FIGS. 4 and 5, a second example of an interface is shown. In this embodiment, the fitting 110 and an adapter 140 are employed. The adapter 140 is best shown in FIG. 4.

The adapter 140 may receive pressurized gas from the spindle passage 38 and may route the pressurized gas to the fitting 110. The adapter 140 may have a first end surface 150, a second end surface 152, a first outer surface 154, a second outer surface 156, an outer step surface 158, an internal surface 160, a first inner surface 162, a second inner surface 164, an inner step surface 166, an adapter fastener hole 168, and at least one adapter passage 170.

The first end surface 150 may be disposed at an end of the adapter 140. The first end surface 150 may be received in the spindle passage 38 as is best shown in FIG. 5. In addition, the first end surface 150 may be spaced apart from the spindle 22.

The second end surface 152 may be disposed opposite the first end surface 150. The second end surface may be disposed proximate or may engage a surface of the fitting 110, such as the fitting step surface 130 to help inhibit leakage of pressurized gas between the fitting 110 and the adapter 140.

The first outer surface 154 may extend from the first end surface 150 toward the second end surface 152. The first outer surface 154 may at least partially define an outside circumference of the adapter 140. In addition, the first outer surface 154 may be disposed in the spindle passage 38 and may engage the spindle 22 to inhibit or prevent leakage of pressurized gas between the spindle 22 and the adapter 140.

The second outer surface 156 may extend from the second end surface 152 toward the first end surface 150 and the outer step surface 158. The second outer surface 156 may at least partially define an outside circumference of the adapter 140 and may have a larger diameter than the first outer surface 154.

The outer step surface 158 may extend from the first outer surface 154 to the second outer surface 156. In at least one embodiment, the outer step surface 158 may engage the second spindle end surface 32 to help position and inhibit axial movement of the adapter 140 with respect to the spindle 22 and/or to inhibit leakage of pressurized gas between the spindle 22 and the adapter 140.

The internal surface 160 may be disposed between and may be spaced apart from the first end surface 150 and the second end surface 152. In at least one embodiment, the internal surface 160 may be axially positioned between first end surface 150 and the outer step surface 158. The internal surface 160 may be spaced apart from the fitting 110 and the connection conduit 102 such that a chamber 180 is provided between the fitting 110 and adapter 140 that may fluidly connect the adapter passage 170 to the fitting hole 124 and/or connection conduit 102.

The first inner surface 162 may extend from the second end surface 152 toward the internal surface 160. The first inner surface 162 may at least partially define an inside circumference of the adapter 140. In addition, the first inner surface 162 may receive and may engage the fitting 110 to inhibit leakage of pressurized gas between the fitting 110 and the adapter 140.

The second inner surface 164 may extend from the internal surface 160 toward the second end surface 152 and may partially define the chamber 180. The second inner surface 164 may at least partially define an inside circumference of the adapter 140 and may have a smaller diameter than the first inner surface 162.

The inner step surface 166 may extend from the first inner surface 162 to the second inner surface 164. In at least one embodiment, the inner step surface 166 may engage a surface of the fitting 110, such as the first fitting end surface 120 to help position and inhibit axial movement of the fitting 110 with respect to the adapter 140 and/or to inhibit leakage of pressurized gas between the fitting 110 and the adapter 140.

The adapter fastener hole 168 may receive the fastener 42 (which is not shown in FIG. 5 for clarity). The adapter fastener hole 168 may extend through the adapter 140 such that the adapter fastener hole 168 may have two openings in the first outer surface 154. The adapter fastener hole 168 may be located between the first end surface 150 and the internal surface 160 and may be spaced apart from the adapter passage 170 to inhibit or prevent pressurized gas from exiting the adapter 140 via the adapter fastener hole 168. As such, the adapter passage 170 may not be fluidly connected to the adapter fastener hole 168. The adapter fastener hole 168 may extend along an axis, such as the spindle fastener hole axis 46 and may be disposed substantially perpendicular to the axis 26.

At least one adapter passage 170 may be provided with the adapter 140. In the embodiment shown in FIGS. 4 and 5, two adapter passages 170 are shown. The adapter passages 170 may be spaced apart from each other and may be disposed on opposite sides of the axis 26 and the adapter fastener hole 168. In addition, the adapter passages 170 may extend substantially parallel to each other in one or more embodiments. Each adapter passage 170 may extend from the first end surface 150 to the internal surface 160 and/or the inner step surface 166. In addition, each adapter passage 170 may be disposed between and may be spaced apart from the first outer surface 154 and the adapter fastener hole 168 to help inhibit leakage of pressurized gas from the adapter 140. The adapter passage 170 may receive pressurized gas from the spindle passage 38 and may route pressurized gas to the chamber 180 and the connection conduit 102.

Referring to FIGS. 6 and 7, a third example of an interface is shown. In this embodiment, the fitting 110 and an adapter 140' are employed.

The adapter 140' may have a similar configuration as the adapter 140 shown in FIG. 4, but may have an adapter passage 170' with a different configuration and may include at least one flat 190'.

In the embodiment shown in FIGS. 6 and 7, two flats 190' are provided. The flats 190' may be spaced apart from each other and may be disposed on opposite sides of the axis 26 and the adapter fastener hole 168. In addition, the flats 190' may extend substantially parallel to each other in one or more embodiments. Each flat 190' may extend from the first end surface 150 to a flat step surface 192'. The flat step surface 192' may be disposed between the first end surface 150 and the outer step surface 158 and may extend from the flat 190' to the first outer surface 154. The flat step surface 192' may extend substantially perpendicular to the axis 26 in one or more embodiments.

At least one adapter passage 170' may be provided with the adapter 140'. In the embodiment shown in FIG. 6, two adapter passages 170' are shown. The adapter passages 170' may be spaced apart from each other and may be disposed on opposite sides of the axis 26. In addition, the adapter passages 170' may be coaxially disposed in one or more embodiments. Each adapter passage 170' may extend from a flat 190' to the chamber 180. For instance, the adapter passage 170' may extend from a flat 190' to the internal surface 160 and/or the second inner surface 164. In addition, each adapter passage 170' may be disposed between a corresponding flat 190' and the adapter fastener hole 168 such that the adapter passage 170' is spaced apart from the adapter fastener hole 168 to inhibit leakage of pressurized gas from the adapter 140' through the adapter fastener hole 168. As such, the adapter passage 170' may not be fluidly connected to the adapter fastener hole 168. In addition, the adapter passage 170' may be completely disposed between the adapter fastener hole 168 and the fitting 110. Pressurized gas in the spindle passage 38 may flow between the spindle 22 and the flat 190' and to the adapter passage 170', which may route the pressurized gas to the chamber 180 and the connection conduit 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
   a spindle that rotatably supports a wheel, the spindle including:
      a spindle passage through which a pressurized gas flows for inflating a tire, wherein the spindle passage is disposed along a spindle axis; and
      a spindle fastener hole that extends through the spindle and that intersects the spindle passage;
   a fitting that is disposed in the spindle passage, wherein the fitting receives the pressurized gas from the spindle passage and is fluidly connected to the tire;
   a fastener tube that extends through the spindle fastener hole, wherein the fastener tube inhibits pressurized gas from flowing from the spindle passage into the spindle fastener hole; and
   a fastener that extends through the fastener tube to inhibit movement of a spindle nut that is disposed on the spindle.

2. The tire inflation system of claim 1 wherein the fitting is axially spaced apart from the fastener tube.

3. The tire inflation system of claim 1 wherein the fastener tube is disposed substantially perpendicular to the spindle axis.

4. The tire inflation system of claim 1 wherein the fastener is a cotter pin.

5. The tire inflation system of claim 1 further comprising a pressurized gas source that supplies the pressurized gas and that is fluidly connected to the spindle passage with a first conduit.

6. The tire inflation system of claim 5 wherein the tire is disposed on the wheel and the fitting is fluidly connected to the tire by way of a second conduit.

7. The tire inflation system of claim 1 wherein the spindle fastener hole extends along a spindle fastener hole axis that intersects the spindle axis and is disposed substantially perpendicular to the spindle axis.

8. The tire inflation system of claim 1 wherein the fastener tube is fixedly positioned with respect to the spindle.

9. The tire inflation system of claim 1 wherein the fitting has a first fitting end surface, a second fitting end surface disposed opposite the first fitting end surface, a fitting hole that extends from the first fitting end surface to the second fitting end surface, and a first fitting outer surface that extends from the second fitting end surface toward the first fitting end surface, wherein the first fitting outer surface is received in the spindle passage.

10. The tire inflation system of claim 9 wherein the fitting hole receives a connection conduit that extends from the second fitting end surface toward the first fitting end surface such that the connection conduit does not extend to the first fitting end surface.

11. The tire inflation system of claim 9 wherein the spindle passage extends along the spindle axis from a first spindle end surface to a second spindle end surface and the fitting includes a second fitting outer surface that extends from the second fitting end surface toward the first fitting outer surface and a fitting step surface that extends from the first fitting outer surface to the second fitting outer surface, wherein the fitting step surface engages the second spindle end surface and the second fitting outer surface is not received in the spindle passage.

12. The tire inflation system of claim 11 wherein the first fitting outer surface engages the spindle in the spindle passage.

13. The tire inflation system of claim 11 wherein the fitting step surface is disposed substantially perpendicular to the spindle axis.

14. The tire inflation system of claim 9 wherein the first fitting end surface is disposed substantially perpendicular to the spindle axis.

15. The tire inflation system of claim 14 wherein the second fitting end surface is disposed substantially perpendicular to the spindle axis.

16. The tire inflation system of claim 15 wherein the spindle fastener hole extends along a spindle fastener hole axis that intersects the spindle axis and is disposed substantially perpendicular to the spindle axis.

* * * * *